United States Patent [19]

Kaplan

[11] Patent Number: 5,392,605
[45] Date of Patent: Feb. 28, 1995

[54] METHOD OF AND APPARATUS FOR REDUCING THE PRESSURE OF A HIGH PRESSURE COMBUSTIBLE GAS

[75] Inventor: Uri Kaplan, Moshav Galia, Israel

[73] Assignee: Ormat Turbines (1965) Ltd., Yavne, Israel

[21] Appl. No.: 868,867

[22] Filed: Apr. 16, 1992

[51] Int. Cl.⁶ .............................................. F01D 11/00
[52] U.S. Cl. ........................................ 60/657; 60/648; 277/15
[58] Field of Search ............... 60/682, 646, 648, 657, 60/683, 689, 672; 277/15; 415/176

[56] References Cited

U.S. PATENT DOCUMENTS

| | | | |
|---|---|---|---|
| 2,854,927 | 10/1958 | Berg | 277/15 |
| 3,909,012 | 9/1975 | Denis | 277/15 |
| 4,606,652 | 8/1986 | Swearingen | 384/130 |
| 4,936,098 | 6/1990 | Nakhamkin | 60/682 X |
| 4,978,278 | 12/1990 | Kun | 277/15 X |

*Primary Examiner*—Stephen F. Husar
*Attorney, Agent, or Firm*—Sandler, Greenblum & Bernstein

[57] ABSTRACT

The pressure of a high pressure combustible gas is reduced by applying the gas to an expander having a rotatable shaft that passes through a seal and is coupled to a generator. Gas that leaks through the seal provides a simple seal and is withdrawn for burning to heat the high pressure gas before it is applied to the expander.

16 Claims, 2 Drawing Sheets

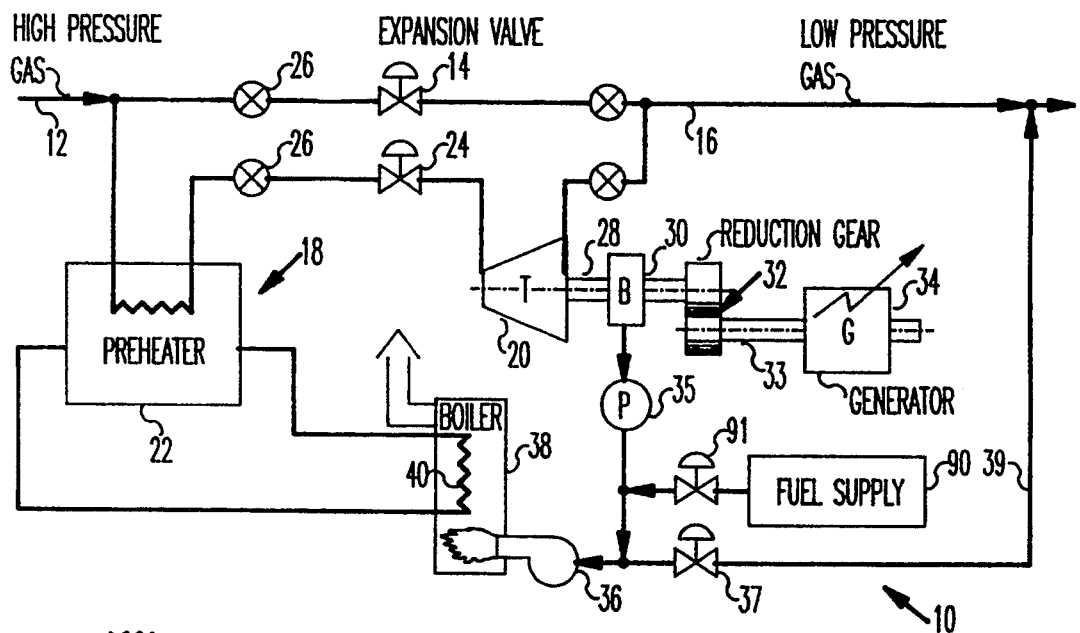
FIG. 1
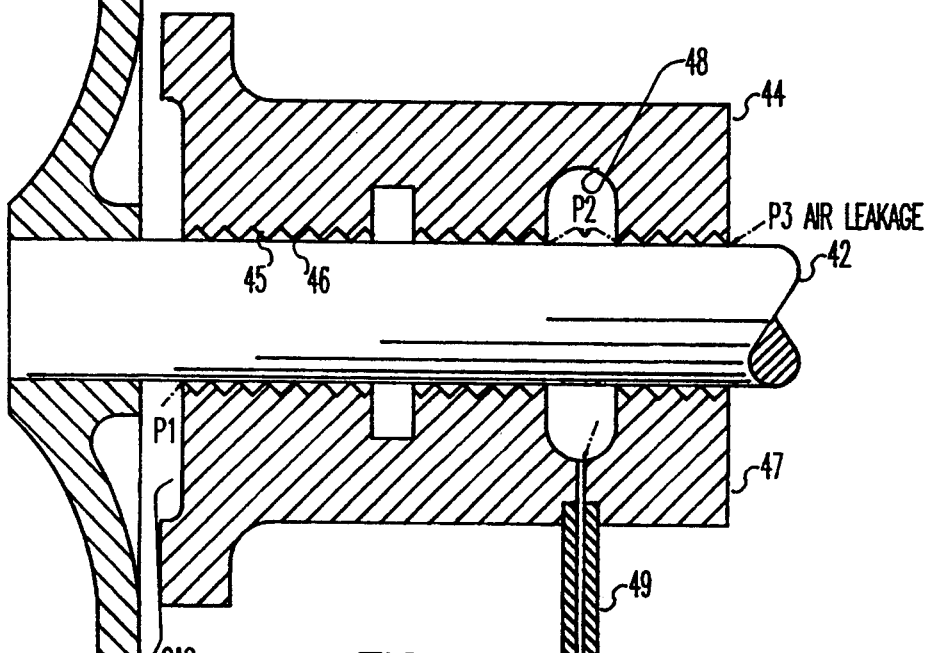
FIG. 2
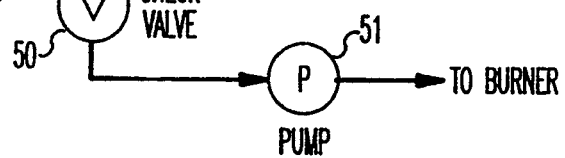

METHOD OF AND APPARATUS FOR REDUCING THE PRESSURE OF A HIGH PRESSURE COMBUSTIBLE GAS

FIELD OF THE INVENTION

This invention relates to a method of and apparatus for reducing the pressure of a high pressure combustible gas, e.g., natural gas.

DISCUSSION OF BACKGROUND AND MATERIAL INFORMATION

Natural gas, and other combustible gases, are routinely transported to users from remote locations via high pressure pipelines. At the user location, it is conventional to apply the high pressure gas to a throttle valve that serves to reduce the pressure of the gas to a level compatible with local distribution and/or use.

Throttling of a high pressure gas wastes the energy expended in the process; and it is presently preferable to recover some of this energy by expanding the gas in an expander rather than by throttling the gas. Here, the high pressure gas expands in a rotary machine such as a turbine coupled to a generator, and some of the pressure reduction is converted to electricity.

Because a temperature drop accompanies the pressure drop through the expander, any moisture in the gas is likely to freeze detrimentally affecting the operation of the expander and utilization devices downstream of the expander. It has been suggested, therefore, to preheat the gas before it is applied to the expander, and to this end, it is conventional to burn fuel for this purpose.

Preventing the freezing of water vapor in the gas is obviously very beneficial from a system standpoint; but warming the gas prior to its expansion does not address another serious problem when the gas being expanded is combustible. The rotary speed of the shaft carrying the expander disk is conventionally very high, and in fact, is much higher than the synchronous speed of the generator to which the shaft is coupled. Combined with the pressure of the gas, the shaft speed of the expander makes it very difficult to effect a perfect seal and prevent leakage. Such leakage, in general, is very dangerous because of the potential for explosion. Leakage in the vicinity of an electric generator is so hazardous as to cause consideration of precluding the use of a generator in the vicinity of an expander operating on combustible gas.

One potential solution to this problem is suggested in U.S. Pat. No. 3,909,012 which discloses a compressor for liquefying natural gas. In this patent, the shaft carrying the compressor is provided with seals adjacent the compressor rotor. Pressurized gas flows away from the compressor through each seal and into a central chamber in the seal which is connected to a pump that extracts the gas and delivers it to a burner. Nitrogen and/or other inert gas is pumped into each seal on the other side of the central chamber so that the nitrogen or inert gas flow in one direction toward the compressor and into the chamber, and in the other direction into a collection chamber which is vented.

While this approach may be viable so far as inhibiting explosions, the approach is somewhat complicated and does not address the problems caused when moisture is present in the combustible gas and freezing occurs during expansion. It is therefore an object of the present invention to provide a new and improved method of and apparatus for reducing the pressure of a high pressure combustible gas, which method and apparatus are less complex than those known in the prior art, and prevent freezing of water vapor in the combustible gas during its expansion.

BRIEF DESCRIPTION OF THE INVENTION

According to the present invention, the pressure of a high pressure combustible gas is reduced by applying the gas to an expander having a rotatable shaft that passes through a seal and is coupled to a generator. Gas that leaks through the seal is withdrawn and burned in order to heat the high pressure gas before it is applied to the expander. In this manner, the invention provides a simple seal, which minimizes metallic contact, for a relatively high speed, rotary expander operating at comparatively high pressures. Furthermore, by drawing off the gas that leaks through the seals and burning the same for heating the combustible gas prior to its expansion, moisture contained in the combustible gas will not freeze as the temperature drops during expansion.

BRIEF DESCRIPTION OF THE DRAWINGS

Embodiments of the present invention are shown by way of example in the accompanying drawings wherein:

FIG. 1 is a schematic block diagram of the present invention showing how combustible gas leaking through the seals associated with an expander is drawn into a burner which heats the high pressure combustible gas before it is expanded;

FIG. 2 is a sectional view taken through the expander and the seal for the expander;

DETAILED DESCRIPTION

Figure 3:
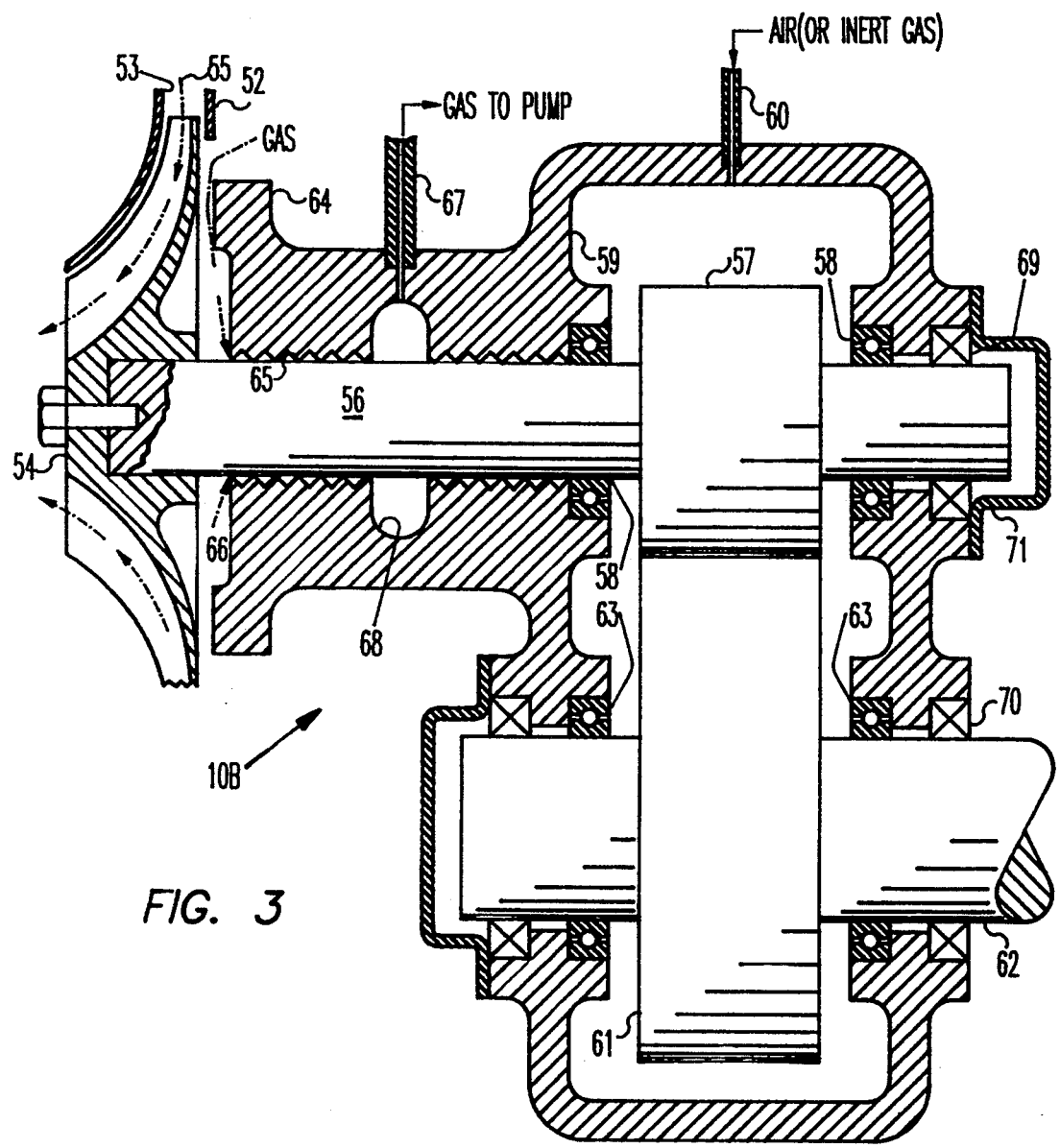
FIG. 3 is a cross-section similar to FIG. 2 but showing the expander connected to a gear reduction unit.

Referring now to the drawing, reference numeral 10 designates apparatus according to the present invention for reducing the pressure of a high pressure combustible gas flowing in the direction indicated by the arrow in high pressure pipeline 12. Expansion valve 14 in pipeline 12 at a user location serves to throttle the high pressure gas to reduce its pressure sufficiently for a user. The low pressure gas is supplied to a user via low pressure pipeline 16. Generally, natural gas is transported by pipeline at pressures of 60 psia. or more, and such pressures are considered to be high in the context of this disclosure. Pressures lower than pipeline pressure are thus considered as being low pressure in this context.

Expansion valve 14 is shunted by the apparatus of the present invention which includes heat exchanger 18 for heating the combustible high pressure gas in pipeline 12 prior to the application of the high pressure gas to expander 20 in the form of a turbine. High pressure gas is piped through preheater 22 and control valve 24 connects the heated high pressure gas to turbine 20 wherein expansion of the gas takes place producing cooler, low pressure gas that is exhausted into low pressure pipeline 16. The apparatus of the present invention can be switched into and out of operation by actuation of control valves 26.

Turbine 20 is rigidly mounted on shaft 28 which passes through seal 30 and is connected via gear reduction means 32 to output shaft 33 on which generator 34 is mounted. Expansion of the high pressure gas in turbine 20 effects high speed rotation of shaft 28 and the consequent rotation of generator 34 for the production of electricity by reason of coupling means 32. Pump 35 is connected to seal 30 for the purpose of withdrawing therefrom, gas from the turbine casing which leaks through the seal. The withdrawn gas is supplied to burner 36 which burns the gas in boiler 38 containing hot water coils 40. Heating of these coils provides hot water to preheater 22 wherein the heat produced by boiler 38 is transferred to the high pressure gas being transported by a heat exchange process.

The apparatus disclosed in FIG. 1 is capable of safely collecting and disposing of combustible gas leaking through the seals of the expander in a way that utilizes the gas for preheating the high pressure combustible gas before it is applied to the expander. Thus, the safety of the system is ensured because the leaking gas is safely shunted from the vicinity of the generator. At the same time, the gas is utilized for the purpose of supplying heat to the combustible high pressure gas in order to prevent the freezing of water vapor while expansion of the high pressure gas is taking place in the expander.

FIG. 2 shows a preferred form of the seal associated with the expander. As indicated, expander disk 41 is constructed to provide for expanding heated high pressure gas to a low pressure. Rotatable shaft 42 is rigidly connected to the expander and passes through seal housing 44 which is provided with central axial bore 45 for receiving shaft 42 and defining a labyrinth-like seal. Projections 46 in bore 45 provide very small clearances for shaft 42 and act to inhibit the leakage of gas from the expander toward free end 47 of housing 44. Located within the seal is collection chamber 48 which is connected via conduit 49 and check valve 50 to pump 51.

The operation of pump 51 serves to reduce the pressure in chamber 48 to a level below the level of the expanded gas in the expander having a pressure $p_1$, and below the pressure $p_3$ of the air and/or other gas at end 47 of the seal. Thus, the pressure in chamber 48, indicated as $p_2$, is less than $p_1$ and is also less than $p_3$. As a consequence, gas leaks axially along shaft 42 from the expander housing toward chamber 48; and pump 51 serves to draw this leakage from the chamber and to supply it to a burner such as burner 36 unit FIG. 1.

Because the rotational speed of the expander is usually higher than the preferred operational speed of a generator, a coupling means, such as gear reducer 32 in FIG. 1, must be provided. The preferred construction of the seal and the coupling means is shown in FIG. 3 to which reference is now made. As indicated, apparatus 10B includes a housing for the expander generally indicated at 52 having expansion chamber 53 containing expander disk 54. This disk is responsive to applied combustible gas, indicated by arrow 55, for expanding the gas and reducing its pressure. The expansion of the gas imparts rotation to disk 54 to which one end of input shaft 56 is rigidly attached. A portion of shaft 56 extends outwardly of expansion chamber 53 and carries pinion 57 which is rigidly attached to shaft 56. A pair of aligned bearings 58 in chamber 59 rotatably supports shaft 56 and consequently disk 54. Pinion 57 is thus positioned between bearings 58 in gear reduction chamber 59 of the housing. Conduit 60 is optionally provided and attached to the housing for permitting usually pressurized air or an inert gas to enter chamber 59.

Gear 61, rigidly connected to output shaft 62, is supported within chamber 59 by a pair of aligned bearings 63 mounted in the housing such that gear 61 meshes with pinion 57. As indicated, shaft 62 projects externally from housing 62 and is coupled to a generator (not shown).

Hub 64 of the housing defines labyrinth seal 65 located between expansion chamber 53 and gear reduction chamber 59 for the purpose of retarding the flow of gas indicated by arrow 66 from the expansion chamber to intermediate chamber 68. Conduit 67 connecting to intermediate chamber 68 of the labyrinth seal is connected to a pump (not shown) for the purpose of reducing the pressure in chamber 68 to a level below the pressure of the gas in the expansion chamber, and also below the pressure of the gases in gear reduction chamber 59 such that gas can be extracted from intermediate chamber 68 via conduit 67.

As a consequence of the construction of the apparatus described above, and in the absence of optional conduit 60, gas flowing along the surface of shaft 56 towards the generator will accumulate in intermediate chamber 68 at a pressure below the pressure of the gas flowing out of the expansion chamber. By extracting gas from chamber 68 at a pressure below the pressure of gas flowing out of the expansion chamber, leakage of combustible gas from the expansion chamber towards the generator is substantially prevented. Furthermore, gas extracted from chamber 68 through conduit 67 is conveyed to a burner as indicated in FIG. 1. As previously indicated, the burning of the combustible gas serves to heat the high pressure combustible gas before it is applied to the expansion disk. Thus, here, the amount of gas extracted from chamber 68 is related to the pressure of the gas in gear reduction chamber 59. For example, if more gas is required in the burner, then the pressure in chamber 59 will decrease, and more gas will flow from expansion chamber 53 to chamber 68. On the other hand, if less gas is required in the burner, the pressure of the gas in chamber 59 will increase thus reducing the quantity of gas flowing from expansion chamber 53 to chamber 68. Bypass line 39 shown in FIG. 1 may be provided for maintaining operational pressure in chamber 68 even when the gas flow required for the burner is relatively low, or even when the burner is not in operation. Bypass line 39 preferably returns surplus gas directly to low pressure line 16 through suitable control valve 37 which may be automated to properly control the flow of gas to the burner.

Optionally, burner 36 may be supplied with fuel from auxiliary fuel supply 90 which is connected via control valve 91 to the input fuel line of burner 36. Valve 91 may be manually operated to supply adequate fuel to the burner from supply 90 when leakage through seal 30 is inadequate to sufficiently heat the high pressure gas, or the expander is shut down for maintenance, and the conventional throttling produces a freeze-up. Alternatively, the operation of valve 91 may be automated in response to sensing the flow of gas to the burner and effecting modulation of the valve opening in accordance with the flow rate of gas in pipeline 12, or the need of the burner based on the temperature of the expanded gas.

If warranted, chamber 59 can be provided without any gearing merely for permitting the accumulation of gas, and substantially reducing or preventing leakage of combustible gas from the expansion chamber towards the generator.

If optional conduit 60 is utilized for permitting air (which is usually pressurized), or an inert gas, to enter gear reduction chamber 59, gas from expansion chamber 53 and air, or a mixture of air, or an inert gas and gas accumulated in chamber 59, flows in opposite directions along the surface of shaft 56 towards chamber 68 and prevents or substantially inhibits the leakage of combustible gas from expansion chamber towards the generator. Moreover, the mixture of air, gas and perhaps inert gas extracted from chamber 68 through conduit 67 is conveyed to a burner as indicated in FIG. 1 to heat the high pressure combustible gas before it is applied to the expansion disk.

Chamber 59 is effectively sealed by providing conventional seals 69 on the free end of shaft 56, and 70 on each side of the bearings by which output shaft 62 is mounted in the housing. Seals 70 are particularly effective because of the relatively low pressure in chamber 59 and the relatively low surface speed of shaft 62. Seal 69 is less critical, nd leakage can be substantially eliminated merely by using cover 71 without seals 69. The volume of chamber 59 is relatively large and acts as a buffer to dampen variations or fluctuations in the gas flow to the burner.

This specification describes the use of an expander in the form of a turbine; but the present invention also contemplates the use of other rotating machinery such as a compressor, agitator, etc. instead of the expander.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for reducing the pressure of a high pressure combustible gas to a lower pressure supplied to a low pressure pipeline by applying the high pressure gas to an expander having a rotatable shaft that passes through a seal and is coupled to a generator, said method comprising the steps of withdrawing gas that leaks through said seal and either burning the withdrawn gas to heat the high pressure gas before it is applied to said expander, or supplying the withdrawn gas to said low pressure pipeline.

2. A method according to claim 1 including selectively burning fuel from a source other than said withdrawn gas to heat the high pressure gas before it is applied to said expander.

3. An expander system for use in reducing the pressure of a high pressure combustible gas comprising:
   a) an expander for expanding the high pressure gas to a lower pressure and having a rotatable shaft that passes through a seal;
   b) a generator for generating power;
   c) coupling means for coupling said shaft to said generator;
   d) a pump connected to said seal for withdrawing gas that leaks through said seal; and
   e) a heat exchanger responsive to a burner for heating the high pressure gas before it is applied to the expander; and
   f) means for connecting the gas withdrawn from said seal by said pump to said burner; and
   g) wherein said coupling means includes a pair of meshing gears enclosed in the housing, and means for pressurizing said housing.

4. An expander according to claim 3 wherein said housing is pressurized with air.

5. An expander according to claim 3 wherein said housing is pressurized with inert gas.

6. An expander according to claim 3 including a check valve interposed between said pump and said seal.

7. Apparatus comprising:
   a) a housing having an expansion chamber containing an expansion disk responsive to an applied high pressure combustible gas for expanding the gas and reducing its pressure as rotation is imparted to the disk;
   b) an input shaft rigidly attached to said disk and having a portion extending from said expansion chamber;
   c) a pinion rigidly attached to said portion of said input shaft;
   d) a gear reduction chamber for accumulating gas, and containing a pair of bearings for rotatably supporting said input shaft and said expansion disk, said pinion being positioned between said bearings;
   e) a gear located in said gear reduction chamber and rigidly attached to an output shaft rotatably mounted in a pair of bearings carried by said gear reduction chamber, said output shaft projecting from said gear reduction chamber;
   f) a labyrinth seal including a collection chamber associated with said housing located between said expansion chamber and said gear reduction chamber for retarding the flow of gas from the expansion to said collection chamber; and
   g) means for reducing pressure in said collection chamber to a level intermediate the pressures in the respective expansion and gear reduction chambers thereby effecting the flow of gas from said expansion chamber and gas from said gear reduction chamber, and substantially preventing leakage of combustible gas from said housing.

8. Apparatus according to claim 7 including means for burning said gas and combustible gas and for heating the combustible gas before it is applied to said disk.

9. Apparatus according to claim 8 including means for connecting the flow of gas from said collection chamber to said means for burning combustible gas such that the high pressure combustible gas is heated before being applied to said disk.

10. Apparatus according to claim 8 wherein said gas accumulated in the gear reduction chamber is substantially said combustible gas.

11. Apparatus according to claim 9 wherein gas in said gear reduction chamber contains air.

12. Apparatus according to claim 8 further comprising means for pressurizing said gear reduction chamber with a gas.

13. Apparatus according to claim 12 wherein gas in said gear reduction chamber contains air.

14. Apparatus according to claim 12 wherein gas in said gear reduction chamber contains an inert gas.

15. Apparatus for reducing the pressure of a high pressure combustible gas to a lower pressure supplied to a low pressure pipeline comprising:
   a) an expander to which said high pressure gas is applied, said expander having a rotatable shaft that passes through a seal;
   b) means for withdrawing gas that leaks through said seal;
   c) a burner for heating said high pressure gas before it is applied to said expander;
   d) a by-pass for conveying withdrawn gas to said low pressure pipeline; and
   e) means for selectively controlling the amount of withdrawn gas supplied to aid by-pass and to said burner.

16. Apparatus according to claim 15 including a fuel source different form said combustible gas, and means for selectively supplying said fuel to said burner.

* * * * *